(12) United States Patent
Fox

(10) Patent No.: US 10,984,490 B2
(45) Date of Patent: Apr. 20, 2021

(54) ARTIFICIAL INTELLIGENCE REAL ESTATE PLATFORM

(71) Applicant: Lehr Holdings, Inc., Palm Harbor, FL (US)

(72) Inventor: William Fox, Palm Harbor, FL (US)

(73) Assignee: LEHR HOLDINGS, INC., Palm Harbor, FL (US)

(\*) Notice: Subject to any disclaimer, the term of this patent is extended or adjusted under 35 U.S.C. 154(b) by 343 days.

(21) Appl. No.: 16/213,120

(22) Filed: Dec. 7, 2018

(65) Prior Publication Data
US 2020/0184582 A1 Jun. 11, 2020

(51) Int. Cl.
*G06Q 50/16* (2012.01)
*G06Q 40/00* (2012.01)
*G06Q 30/02* (2012.01)
*G06N 5/02* (2006.01)

(52) U.S. Cl.
CPC .............. *G06Q 50/16* (2013.01); *G06N 5/02* (2013.01); *G06Q 30/0201* (2013.01); *G06Q 40/12* (2013.12)

(58) Field of Classification Search
CPC .... G06Q 50/16; G06Q 40/12; G06Q 30/0201; G06N 5/02
See application file for complete search history.

(56) References Cited

U.S. PATENT DOCUMENTS

| 2003/0105705 | A1* | 6/2003 | Eyre | G06Q 40/04 705/37 |
| 2020/0184582 | A1* | 6/2020 | Fox | G06Q 50/16 |

\* cited by examiner

*Primary Examiner* — A. Hunter Wilder
*Assistant Examiner* — Tim Underwood, III
(74) *Attorney, Agent, or Firm* — Saliwanchik, Lloyd & Eisenschenk

(57) ABSTRACT

Improved customer relationship management systems and methods are provided. A system can include a private blockchain network of real estate transaction related information and a computer-based network, which can be configured to transmit educational materials to a user, authorize transfer of profit sharing to members of the system; provide artificial intelligence based information to the user, transmit sales and marketing materials to the user, authorize membership, and gather real estate based information.

1 Claim, 1 Drawing Sheet

ARTIFICIAL INTELLIGENCE REAL ESTATE PLATFORM

BACKGROUND

The world is changing and the sharing economy is one of the current changes affecting the global economy. There are several drivers of this sharing economy. Business models are adapting to the sharing economy; customers are becoming linked through social networks; and advances in electronic commerce make it easier to use shared goods and services. The sharing economy involves using information technology that provides individuals and businesses with information that allows resource optimization, i.e., the sharing of goods and services where society benefits.

Changing the customer experience is causing market disruption that is driving companies to reinvent their business models. Customer experience is the most important aspect of a successful company. Customers have become accustomed to getting their needs satisfied at places of their own choosing and on their schedule. Realtors are not only competing against each other for a listing, but with the experience the customers have had with other business such as Starbucks, Airbnb, or Lyft.

The real estate industry has been undergoing dramatic changes during the past decade. There has been a significant increase in the number of licensed agents and resulting competition has driven down the average commission paid by sellers. Alternatives to the commission model have emerged such as flat-fee and for-sale-by-owner tools. Mobile applications, such as Zillow and Trulia, are also changing the way realtors do business. Price increases for inclusion in MLS and any related fees are rising and are in turn reducing net compensation for many real estate agents.

BRIEF SUMMARY

Customer information has been logged by businesses and other entities using many different methods over the years. Prior to the 1960s, pen and paper was primarily used. Starting around the 1960s, Rolodexes or similar devices were used for keeping track of customer information. The Lotus 123 and similar devices were introduced around the 1980s, and related art customer relationship management (CRM) systems have been predominantly used since the 2000s. These can all collectively be thought of as "old systems" compared to systems and methods of embodiments of the subject invention.

Embodiments of the subject invention provide forward-thinking technology linking owners, buyers, sellers, lessees, lessors, agents, brokers, title companies, mortgage companies, surveyors, advertising companies, decorators, contractors, educators, financial advisors, warranty companies, SMART (intelligent) home consultants, sales & marketing firms, students, and/or any person or company involved in the real estate industry. Many embodiments provide improved CRM systems to this end.

Participants of a CRM system of embodiments of the subject invention can accumulate rewards for each interaction with the system. These rewards can include, for example, an allocation of profit sharing participation (e.g., a regular profit sharing such as annual profit sharing). The system provides the ability to see how everyone is related. An electronic "bread crumb trail" is left on each transaction linking any location (L—a physical address), entity (E—a person), and organization (O—a business entity) that interacts with a member. For example, all information related to a particular member or particular transaction can be accessed and viewed, so that it can be used to learn about that particular member or transaction. All of this is done through the member portal that resides behind a secure firewall. The system incentivizes members to maintain data superiority, e.g., through rewards. The system provides participants with the ability to spend more time with others assisting in the buying, selling, and renting of real properties. The system eliminates the need to search multiple databases or silos for bits and pieces of information, thereby also inhibiting getting bogged down by duplicate information. The system centralizes the data and provides it all in one location in real time.

In an embodiment, an incentivized customer relationship management system for real estate can include: a private blockchain network for storing real estate transaction related information; and a computer-based network configured to transmit educational materials to a first user of the system, authorize transfer of profit sharing to members of the system, provide artificial intelligence based information to the first user, transmit sales and marketing materials to the first user, authorize membership, and gather real estate based information. The system can be configured such that the first user can permit a third party to access the respective stored real estate transaction related information of the first user. Though this is indicated as being for a generic "first user", the same features and principles can apply for all users of the system.

In another embodiment, a computer-based method of incentivizing a customer relationship management system can comprise: providing a computer network configured to transmit educational materials to a first user of the customer relationship management system, provide artificial intelligence based information to the first user, transmit sales and marketing materials to the first user, authorize membership, and gather real estate based information of the first user; detecting, by a processor, each instance of interaction by the first user with the customer relationship management system; and allocating a predefined quantity of reward units for each instance of interaction by the first user with the customer relationship management system. Though this is indicated as being for a generic "first user", the same features and principles can apply for all users.

The goal of a real estate CRM is to integrate sales, marketing, and customer support. Related art CRM systems fail due to the lack of buy-in from the stakeholders, which causes data to be untimely and inaccurate. Additionally, traditional CRM systems do not provide immediate and robust intelligence to those who interact with it. To solve these problems, the LEO system provides stakeholders with a system that incentivizes participation. The LEO system documents and organizes each interaction between a user and the system to keep data accurate and timely on a continuous basis. Inbound and outbound communications from users, LEO, and third parties can go through and be captured by the LEO system. This includes, for example, emails, texts, chats, phone calls, and transaction documents. It is not necessary to have separate respective systems for phone calls, email, accounting, referrals, social media, opportunity management, or engagements.

DETAILED DESCRIPTION

Figure 1:
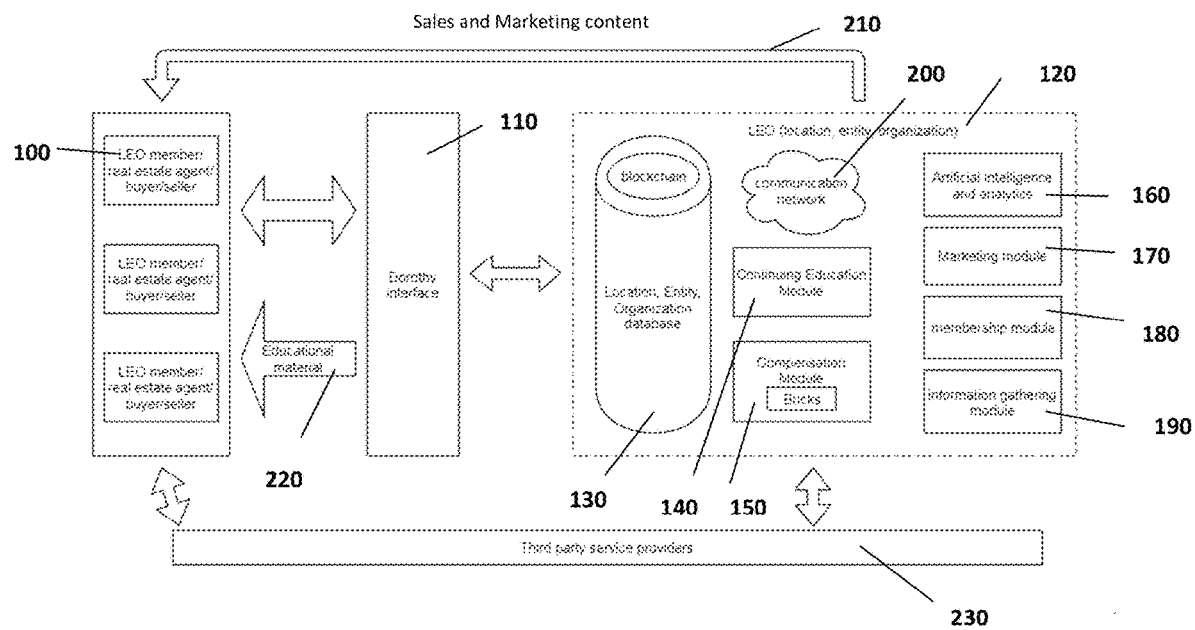
FIG. 1 is a block diagram of a system according to an embodiment of the subject invention.

The following disclosure and exemplary embodiments are presented to enable one of ordinary skill in the art to make and use a customer relationship management system for real estate transactions according to the subject invention. Various modifications to the embodiments will be readily apparent to those skilled in the art and the generic principles herein may be applied to other embodiments. Thus, the devices and methods related to the system are not intended to be limited to the embodiments shown, but are to be accorded the widest scope consistent with the principles and features described herein.

Embodiments of the subject invention provide forward-thinking technology linking owners, buyers, sellers, lessees, lessors, agents, brokers, title companies, mortgage companies, surveyors, advertising companies, decorators, contractors, educators, financial advisors, warranty companies, SMART (intelligent) home consultants, sales & marketing firms, students, and/or any person or company involved in the real estate industry. Many embodiments provide improved customer relationship management (CRM) systems to this end.

Participants of a CRM system of embodiments of the subject invention can accumulate rewards for each interaction with the system. These rewards can include, for example, an allocation of profit sharing participation (e.g., a regular profit sharing such as annual profit sharing). The system provides the ability to see how everyone is related. An electronic "bread crumb trail" is left on each transaction linking any location (L—a physical address), entity (E—a person), and organization (O—a business entity) that interacts with a member. All of this is done through the member portal that resides behind a secure firewall. The system incentivizes members to maintain data superiority, e.g., through rewards. The system provides participants with the ability to spend more time with others assisting in the buying, selling, and renting of real properties. The system eliminates the need to search multiple databases or silos for bits and pieces of information, thereby also inhibiting getting bogged down by duplicate information. The system centralizes the data and provides it all in one location in real time.

Currently, related art CRM systems provide no incentive to provide updated personal information or other types of information, leading to stale and incorrect data. Systems of embodiments of the subject invention, which can be referred to as a LEO (location, entity, organization) system, alter a user's relationship with the system by providing a reward to the user for each interaction or "touch" with the system. If, for example, the user sets up an account and enters user information, he or she is allotted a certain percentage of profit sharing participation (e.g., a regular profit sharing such as annual profit sharing). If the user updates the user information (e.g., the user location or employer), the user can receive additional profit sharing. If the user provides a referral (e.g., for a new user/potential member) or provides one or more ideas for improving the system (e.g., an idea provided to a location, entity, organization, or member higher up in the system), the user can receive additional profit sharing. Each interaction with the system does not necessarily result in the same allotment of percentage of profit sharing. For example, if a user lists a property through the system they may receive a certain percentage of profit sharing, whereas a user who reviews educational content may receive a different percentage (e.g., a lower percentage or a higher percentage) of the profits.

In certain embodiments, the system can allocate units of profit sharing (for example, such a unit can be referred to as a "brick", though embodiments are not limited thereto), and certain types of user interactions with the system can result in the user being rewarded with a certain number of units (e.g., one unit, two units, three units, etc.), depending on the type of interaction. The number of units can be made known to users ahead of time, in order to incentivize and/or encourage certain types of interactions or activity even more than certain other types. At the end of a defined period (e.g., a fiscal year), the number of units held by a user can be divided by the total number of units allocated to all users to determine that user's percentage of profit sharing. Alternatively, or in addition, the number of units can be used to determine ownership of a portion or the entirety of the system (e.g., the number of units held by a user can be divided by the total number of units allocated to all users to determine that user's percentage of ownership of a portion of the system available for user ownership).

The types of interactions that can lead to receiving a percentage of the profits include, but are not necessarily limited to, setting up an account, updating contact information, listing a property, searching for properties, electronic or telephonic communication through the system, and reviewing educational content.

FIG. 1 shows a block diagram of a system according to an embodiment of the subject invention. Referring to FIG. 1, a user 100 can access the system through a web page or mobile application 110. Users can include current LEO members, prospective members, or other non-member third parties. The interface 110 can be accessed through a mobile computing device, desktop computer, or other computing device and connects the user 100 to the backend LEO system 120. The LEO system 120 includes a history of data deposits, messages, or transactions organized in a series of blocks 130, a continuing education module 140 for providing educational content 220 to a user, a compensation module 150 for calculating the amount of compensation (e.g., profit sharing percentage such as units ("bricks")) to be paid to a LEO member 100, an artificial intelligence and analytics module 160 for processing data and providing analytics, a marketing module for transmitting sales and marketing content 210 to members or users 100, a membership module 180 for managing new and existing member information, and an information gathering module 190 for gathering information to provide to the other modules. The system, as seen in FIG. 1, is implemented in the form of software algorithms operated on specially programmed general purpose computers. Each above-referenced module is a subsystem of the system that receives and generates data that is transmitted to other modules. The overall function of the system is to implement embodiments of the present invention of an incentivized, improved CRM system.

Each module can refer to software, firmware, hardware, and/or various combinations thereof. The modules can be combined, integrated, separated, and/or duplicated to support various functions or applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Figure 2:
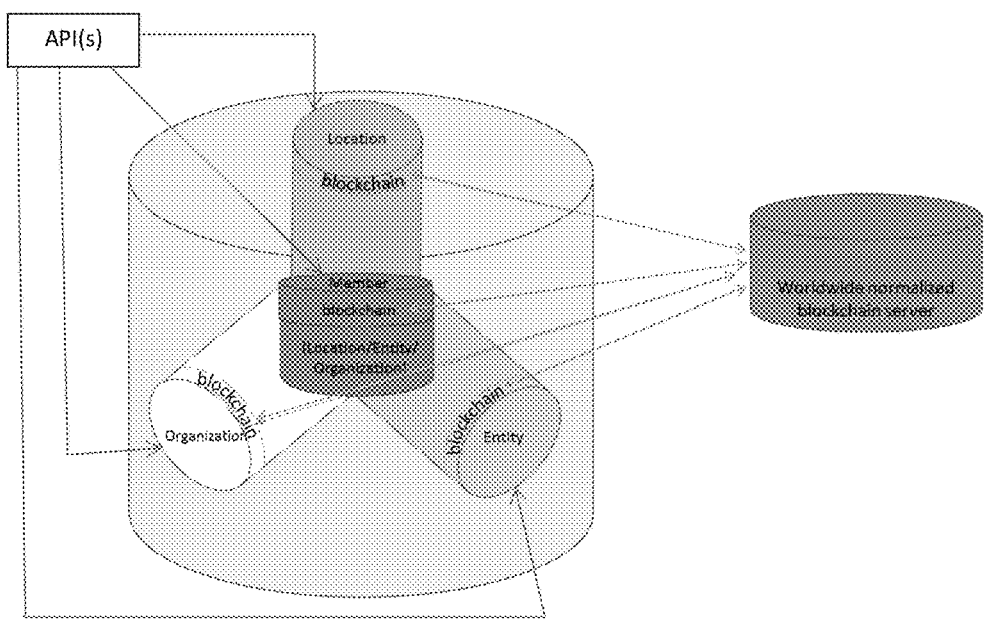
FIG. 2 is a block diagram of a blockchain that can be used with a system according to an embodiment of the subject invention.

FIG. 2 shows a diagram of a private blockchain configuration 130 that can be used in a system according to an embodiment of the subject invention. Each member-related transaction can be identified by one of three distinct characteristics: location; entity; and organization. One or more application program interfaces (APIs) (e.g., third party APIs) can be utilized. Any one of location, organization, entity, and member can communicate directly with one or more APIs (e.g., third party API plug-ins). That is, all of location, organization, entity, and member (or any subset thereof) can respectively communicate directly with one or more APIs (e.g., third party API plug-ins). The APIs are optional.

The worldwide normalized blockchain server shown in FIG. 2 is optional. If it is not present, the location, organization, entity, and member communicate with each other directly, instead of going through the worldwide normalized blockchain server. Whether the worldwide normalized blockchain server is present or not, all locations, entities, organizations, and members that confirm their information at least once per year can participate in the profit sharing by earning units of profit sharing. The architecture shown in FIG. 2, with or without the worldwide normalized blockchain server (and with or without APIs) can be infused in all enterprises.

Each private blockchain is a ledger of all real estate transactions conducted through the LEO system and based upon the member, location, entity, and organization of the parties involved. In other words, a record of a transaction can be sequentially stored in respective blockchains based upon member, location, entity, and organization. One or more computing devices or nodes can be configured to process and record the transactions as part of a block in a respective blockchain. Once a computing device has processed a block, the block is added to the respective blockchain and the transaction record is thereby updated. The blockchain can be a ledger of transactions in sequential order, or other order that may be suitable for use by the LEO system.

Entries can include property locations, financial transactions related to the respective locations, financial institutions involved in the transactions, and negotiated terms of exchange between the parties. In some embodiments, additional information may be captured, such as a timestamp, geolocation, and/or related transactions. In other embodiments, a respective block of a blockchain comprises additional data including proof of work and/or any other suitable verification techniques associated therewith. In some cases, such data may be included in the blockchain as part of transactions, such as included in additional data appended to transaction data.

In many embodiments, the system can include multiple different computer nodes that each operate to mine and thereby validate transactions submitted by members to the blockchain. Initially, the information can be transmitted by a member to a node of the blockchain. Once the node receives a transaction, it may propagate the transaction to other nodes within the blockchain.

A member 100 can transmit transaction information through the interface 110. Once the information is verified, the system can append a record of the transaction to the blockchain.

A member 100 can grant conditional access or license to their personal information on the blockchain through the interface 110. The member can designate conditional permissions for particular personal information and restrict access to other information. These permissions can be transmitted to the membership module to 180 to initiate an agreement between the member 100 and a third party service provider 230. The member can authorize the membership module 180 to initiate agreements with other providers with respective particular terms. The agreements can use suitable protocols to execute and enforce the agreements between the parties. The agreements can be both self-executing and or self-enforcing. A record of the agreements, including modifications and termination, can be recorded in the blockchain.

The membership module 180 can issue a token to a third party service provider 230. The token denotes permission by the member and the conditions upon which those permissions were granted. The system can be configured to interact with other systems, including third party service providers.

The continuing education module 140 services all uploading, transmission, and viewing of educational content. System administrators can upload educational content including video and audio files to the system. The educational content 220 can be sub-divided into categories and topics. For example, instructional videos can be provided to new members 100 to provide guidance on using the system. Additionally, advanced educational content 220 can be provided to provide business insight including advanced sales techniques and strategies that incorporate economic forecasting. A user 100 can access the system to browse a list of available categories and topics, and choose to stream or download a file. In addition, the artificial intelligence and analytics module 140 can gather data from the user to suggest titles based upon a user's projected needs or past selections. Each time that a member 100 accesses the education content 220, the member 100 can be rewarded by a percentage of profits (e.g., one or more "bricks").

The compensation module 150 services all computation and requests for compensation for interactions with the system. The compensation module 150 records each interaction with the system and allocates a reward based upon each respective interaction. The profit percentage reward (e.g., number of "bricks") can be based upon each specific activity invoked by each interaction with the system. The profit percentage amount is not static and can be varied based upon changes to the business environment. The compensation module 150 records each interaction, computes a percentage of profit sharing (alternatively, or additionally, ownership) to be allotted to the member, and initiates transfer of funds to the members. The compensation module 150 can also provide an up-to-date record of the profit percentage owed to each member from determining the premium/discount rates for the components as well as current rates of percentages provided for each activity.

Profit percentage allotments can be further sub-divided into sub-groups. For example, members can be rewarded with greater profit percentages for engaging the system for an increased period of time or greater frequency than other members. The profit percentage allotments for each activity can be available to individual users by accessing the system.

The artificial intelligence and analytics module 160 provides support for members engaging in real estate transactions. For example, a member 100 can access to system to query the module 160 for advice including but not limited to financial instruments, projected property values, product trends, and population trends. The artificial intelligence and analytics module 160 can also receive member data and not only provide the member 100 with suggestions for educational content 220 based upon projected value added to the member, but recommend additional educational content 220 to the system administrators based upon the member's current and projected needs. The educational content 220 and advice provided by the artificial intelligence and analytics module can promote strategic thinking and partnership amongst the LEO members. For example, a member seeking to purchase property in a specific geographic location can be recommended to another member who is offering financing in that location. In additional the artificial intelligence and analytics module 160 can review a member's information including location, entity, and organization and recommend or initiate the transmission of targeted sales and marketing materials 210 to the member. The artificial intelligence and analytics module 160 continues to learn based upon input from members including but not limited to member questions, geographic, economic, and transactional data. The knowledge from learning is used to enhance the services provide by the module.

The artificial intelligence module 160 uses computational algorithms that combine data, techniques, and methodologies to assist members and entities to navigate through real estate-based transactions. The artificial intelligence module can be trained using available data sets and learn to optimize performance in a changing real estate environment. The artificial intelligence module 160 can include at least one of the following computational techniques: neural network; constraint program; fuzzy logic; classification; conventional artificial intelligence; symbolic manipulation; fuzzy set theory; evolutionary computation; cybernetics; data mining; approximate reasoning; derivative-free optimization; decision trees; soft computing; or a combination thereof.

The marketing module 170 may receive or query location data from one or more members 100. The marketing module 170 can receive location-based data from a member's computing or mobile device or from the database 130. The location-based information can be received along with other data. For example, a mobile device identifier may be received and may be used to identify stored preferences, stored searches, transaction history, credit rating, and other data associated with a user of a member 100. The marketing module 170 can receive as, for example, user preferences, a search item, a specified price range, a specified location range, one or more product attributes, one or more service attributes, payment information, and account information. The marketing module 170 may further include a transmission device to communicate with a member 100. The computing device can transmit real estate information, including pricing information, contractual information, and other notifications. The marketing module 170 may include one or more modes of communication to reach the system, a member, buyer or seller, third party vendor or other similar user. The user transmission device may further be configured to send an electronic communication, including emails and advertisements to a user. The user device may further be configured to communicate via social media. For example, the marketing module 170 may be coupled with a printing device to print sales and marketing materials that are automatically mailed to a member. In another embodiment, the marketing module 170 may be coupled to a device to generate automatic telephone calls, or "robo-calls," or other similar communication mediums to communicate with a member.

The marketing module 170 can also receive data from the artificial intelligence module 160 to tailor marketing materials transmitted to a member based upon a member's projected needs. The marketing module can also transit materials, for example potential listings based on an artificial intelligence module's projection of the real estate landscape.

The membership module 180 services all membership records including entering new member information, updating existing member information, and verifying membership. The membership module 180 can also monitor changes in membership information including changes to location, entity, and organization and transmit changes in membership information to other modules including the artificial intelligence module 160 and the marketing module 170. The membership module 180 is coupled to the interface 110 to permit new and existing members to enter and update their data through the interface.

The information gathering module 190 retrieves and stores data from external sources for use from other modules. For example the information gathering module 190 can gather housing data and employment data. Other modules, for example, the artificial intelligence module can retrieve data from the information gathering module 190 to perform market analysis and provide recommendations to members 100. The information gathering module 190 will seek data from more than member input. The module will be search publically available databases and can have access to private databases through subscription or licensing agreements. The information gathering module 190 can also receive direction from the artificial intelligence module 160 to retrieve particular types of data or data from particular sources to assist members.

A member, including existing or current members, can access the system using a computing device (not shown). The computing device can includes a global navigation satellite system (GNSS) receiver, an accelerometer, a gyroscope, a processor, memory device, communication interface, peripheral device interface, display device interface, and/or a storage device.

The memory device can be or can include a device such as a Dynamic Random Access Memory (D-RAM), Static RAM (S-RAM), or other RAM or a flash memory. The storage device can be or include a hard disk, a magneto-optical medium, an optical medium such as a CD-ROM, a digital versatile disk (DVDs), or BLU-RAY disc (BD), or other type of device for electronic data storage.

The communication network 200 may be, for example, a communications port, a wired transceiver, a wireless transceiver, and/or a network card. The communication network 200 may can communicate using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The display device interface can be an interface configured to communicate data to display device. The display device may be, for example, an in-dash display, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface may operate using technology such as Video Graphics Array (VGA), Super VGA (S-VGA), Digital Visual Interface (DVI), High-Definition Multimedia Interface (HDMI), or other appropriate technology. The display device interface can communicate display data from the processor to the display device for display by the display device. The display device can be distinct from the computing device, and coupled to the computing device via the display device interface. Alternatively, the display device can be included in the computing device.

The communication network 200 can also include party to party communication capabilities. Communication capabilities include internet-based calls, text messages including short message service (SMS) and multimedia messaging service (MMS), and voicemails. The system, through a caller's communication device, can be notified of the intent to establish a telephone call connection over an internet connection by caller party to a receiving party. Then the system can establish a connection with the caller and receiving party's communication device and automatically establish an internet connection and then a connection to a directory service on the Internet.

Systems of embodiments of the subject invention permit members to allow access to their information by third party service providers 230. The system can be configured to permit members to grant access to, or revoke access from, respective third party service providers 230 at any time. The third party service providers 230 can use the information to direct sales and marketing materials directly to the members 100. The members 100 can then purchase products directly from the third party service providers 230. The compensation module 150 can record the third party vendor 230 access to the member information contained in the blockchain framework and direct compensation (e.g., "bricks") to the member 100 in exchange for granting the license.

Systems of embodiments of the subject invention provides at least the following features and advantages: (1) inclusive widely-defined membership of traditional and non-traditional real estate participants; (2) information gathering functionality from expanded sources and types; (3) a compensation system for all members; (4) educational content that teaches and provides insight; (5) behavior/experience strategies that promote collaboration between members; (6) efficiency, effectiveness, flexibility, and profitability (inherent in all LEO interactions ("touches")); (7) positive influences on business/organizational matters through the speed, value, and immediacy of information; (8) intelligence driven sales and marketing tactics and strategies; (9) artificial intelligence driven value to all aspects of business for members; and (10) instant access to knowledge and information.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

An incentivized customer relationship management system for real estate, the system comprising:
a private blockchain network for storing real estate transaction related information; and
a computer-based network configured to transmit educational materials to a first user of the system, authorize transfer of profit sharing to members of the system, provide artificial intelligence based information to the first user, transmit sales and marketing materials to the first user, authorize membership, and gather real estate based information,
wherein the system is configured such that the first user can permit a third party to access the respective stored real estate transaction related information of the first user.

Embodiment 2

The system according to embodiment 1, wherein the private blockchain network comprises:
a member blockchain configured to record a transaction based upon user identity;
a location blockchain configured to record a transaction based on property location;
an entity blockchain configured to record a transaction based on entity; and
an organization blockchain configured to record a transaction based on organization.

Embodiment 3

The system according to any of embodiments 1-2, wherein the educational materials are real estate related materials.

Embodiment 4

The system according to any of embodiments 1-3, wherein the computer-based network is further configured to transmit sales and marketing materials to a second user involved in a real estate transaction with the first user.

Embodiment 5

The system according to any of embodiments 1-4, wherein the computer-based network is further configured to authorize allocation of profit sharing units based upon interaction by the first user with the system.

Embodiment 6

The system according to any of embodiments 1-5, wherein the computer-based network is further configured to actually allocate a predefined quantity of profit sharing units for each instance of interaction by the first user with the system.

Embodiment 7

The system according to embodiment 6, wherein the predefined quantity of profit sharing units allocated varies depending on the type of interaction by the first user with the system.

Embodiment 8

The system according to any of embodiments 6-7, wherein the system is configured such that the profit sharing units allocated to the first user are used to calculate a percentage of profit sharing received by the first user, wherein the percentage of profit sharing received by the first user is calculated by dividing the number of profit sharing units allocated to the first user by the total number of profit sharing units allocated to all users of the system.

Embodiment 9

The system according to any of embodiments 1-8, wherein the computer-based network is further configured to transmit sales and marketing materials as suggested by an artificial intelligence-based recommendation.

Embodiment 10

The system according to any of embodiments 1-9, wherein the computer-based network is further configured to transmit at least one of an electronic communication, a print material, and a robo-call to the first user.

Embodiment 11

The system according to any of embodiments 1-10, wherein the computer-based network is further configured to electronically introduce users to each other based upon a desired real estate transaction by one of the introduced users.

Embodiment 12

The system according to any of embodiments 1-11, wherein the computer-based network is further configured to be accessed by a web-based interface.

Embodiment 13

The system according to any of embodiments 1-12, wherein the computer-based network is further configured to transmit at least one of an electronic communication, a print material, or a robo-call to a second user who is in a real estate transaction with the first user.

Embodiment 14

The system according to any of embodiments 1-13, wherein the computer-based network is further configured to enable internet-based communication between the first user and at least one other user.

Embodiment 15

The system according to any of embodiments 1-14, wherein the computer-based network is further configured to transmit information via a social media account of the first user.

Embodiment 16

The system according to any of embodiments 1-15, wherein the computer-based network is further configured to record access of the first user's real estate transaction related information by a third party.

Embodiment 17

The system according to any of embodiments 1-16, wherein the computer-based network is further configured to update the private blockchain network with inputted changes to at least one of member, location, entity, and organization of the first user.

Embodiment 18

The system according to any of embodiments 1-17, wherein the computer-based network is further configured to record agreements to permit access to user related information, including modifications and termination between the first user and a third party.

Embodiment 19

The system according to any of embodiments 1-18, wherein the computer-based network is further configured to search public databases, private databases, or both.

Embodiment 20

The system according to any of embodiments 1-19, wherein the computer-based network is further configured to recommend educational content to the first user based upon respective stored real estate transaction related information of the first user.

Embodiment 21

The system according to any of embodiments 1-20, wherein the computer-based network is further configured to timestamp data contained in a block of a blockchain.

Embodiment 22

A computer-based method of incentivizing a customer relationship management system, the method comprising:
providing a computer network configured to transmit educational materials to a first user of the customer relationship management system, provide artificial intelligence based information to the first user, transmit sales and marketing materials to the first user, authorize membership, and gather real estate based information of the first user;

detecting, by a processor, each instance of interaction by the first user with the customer relationship management system; and allocating a predefined quantity of reward units for each instance of interaction by the first user with the customer relationship management system.

Embodiment 23

The method according to embodiment 22, wherein the customer relationship management system includes any of the features from embodiments 2-21 or any combination thereof.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An incentivized customer relationship management system for real estate, the system comprising:
   a private blockchain network for storing real estate transaction related information; and
   a computer-based network configured to transmit educational materials to a first user of the system, authorize transfer of profit sharing to members of the system, provide artificial intelligence based information to the first user, transmit sales and marketing materials to the first user, authorize membership, and gather real estate based information,
   wherein the system is configured such that the first user can permit a third party to access the respective stored real estate transaction related information of the first user,
   wherein the private blockchain network comprises:
      a member blockchain configured to record a transaction based upon user identity;
      a location blockchain configured to record a transaction based on property location;
      an entity blockchain configured to record a transaction based on entity; and
      an organization blockchain configured to record a transaction based on organization,
   wherein the educational materials are real estate related materials,
   wherein the computer-based network is further configured to transmit sales and marketing materials to a second user involved in a real estate transaction with the first user,
   wherein the computer-based network is further configured to authorize allocation of profit sharing units based upon interaction by the first user with the system,
   wherein the computer-based network is further configured to actually allocate a predefined quantity of profit sharing units for each instance of interaction by the first user with the system,
   wherein the predefined quantity of profit sharing units allocated varies depending on the type of interaction by the first user with the system,
   wherein the system is configured such that the profit sharing units allocated to the first user are used to calculate a percentage of profit sharing received by the first user, wherein the percentage of profit sharing received by the first user is calculated by dividing the number of profit sharing units allocated to the first user by the total number of profit sharing units allocated to all users of the system,
   wherein the system is configured to initiate transfer of funds to the first user based on the calculated percentage of profit sharing,
   wherein the computer-based network is further configured to transmit sales and marketing materials as suggested by an artificial intelligence-based recommendation,
   wherein the computer-based network is further configured to transmit at least one of an electronic communication, a print material, and a robo-call to the first user,
   wherein the computer-based network is further configured to electronically introduce users to each other based upon a desired real estate transaction by one of the introduced users,
   wherein the computer-based network is further configured to be accessed by a web-based interface,
   wherein the computer-based network is further configured to transmit at least one of an electronic communication, a print material, or a robo-call to the second user who is in a real estate transaction with the first user,
   wherein the computer-based network is further configured to enable internet-based communication between the first user and at least one other user,
   wherein the computer-based network is further configured to transmit information via a social media account of the first user,
   wherein the computer-based network is further configured to record access of the first user's real estate transaction related information by a third party,
   wherein the computer-based network is further configured to update the private blockchain network with inputted changes to at least one of member, location, entity, and organization of the first user,
   wherein the computer-based network is further configured to record agreements to permit access to user related information, including modifications and termination between the first user and a third party,
   wherein the computer-based network is further configured to search public databases, private databases, or both,
   wherein the computer-based network is further configured to recommend educational content to the first user based upon respective stored real estate transaction related information of the first user, and
   wherein the computer-based network is further configured to timestamp data contained in a block of a blockchain.

* * * * *